Patented Feb. 6, 1934

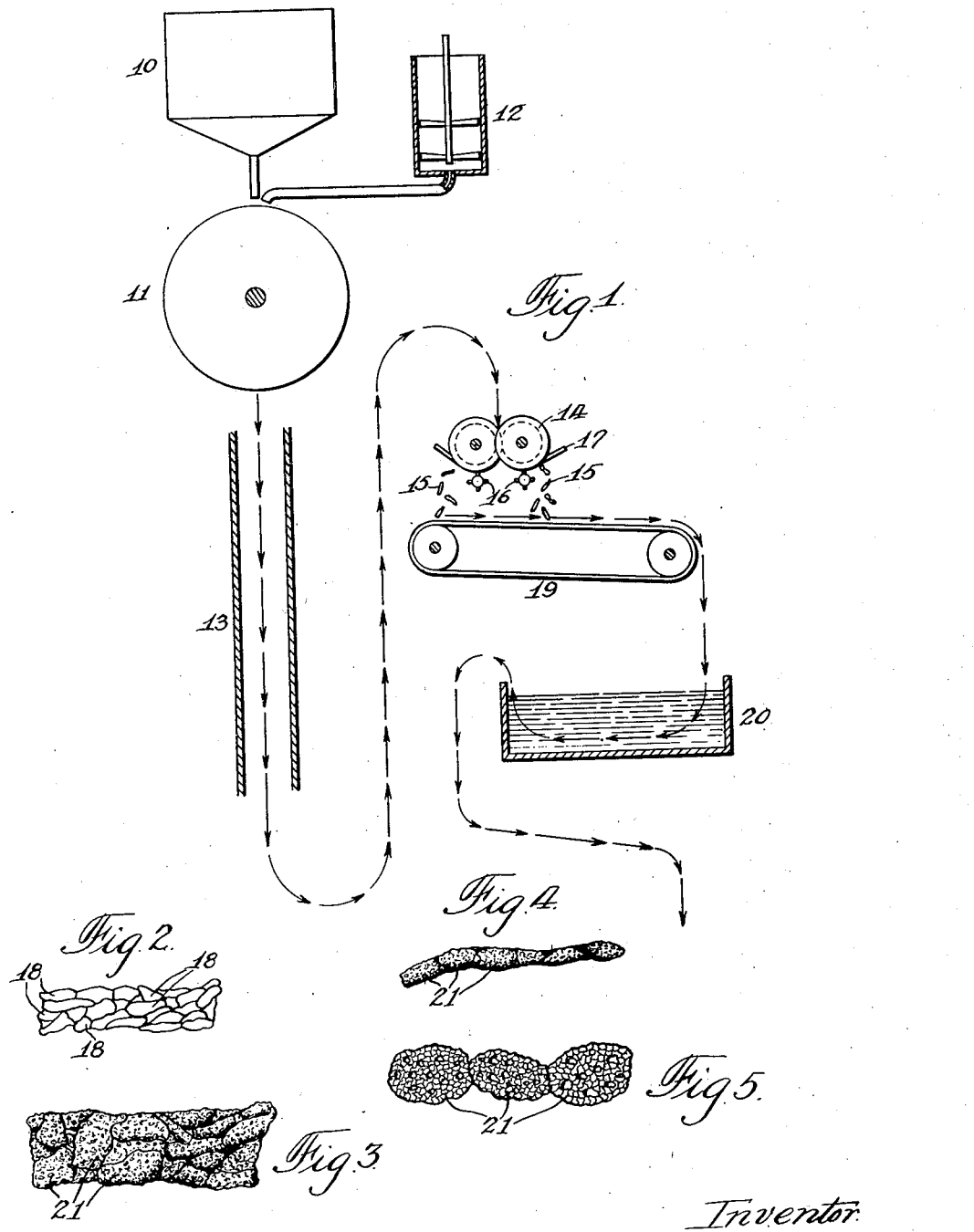

1,945,947

UNITED STATES PATENT OFFICE 1,945,947

CEREAL FOOD

Eugene H. McKay, Battle Creek, Mich., assignor to Kellogg Company, Battle Creek, Mich., a corporation of Delaware Application September 2, 1933, Serial No. 687,923

13 Claims. (Cl. 99—10)

This invention relates to a process for making a new and novel ready-to-eat cereal food, and also to a new cereal food product of a very palatable character, the present application being a continuation in part of my co-pending application Serial No. 428,563, filed February 15, 1930.

One of the objects of the invention is to provide a method of treating cereal grains and/or parts thereof, and particularly rice, so as to prepare the same for eating out of hand or otherwise without further treatment and, if desired, without the addition of cream, sugar or other adjuncts or accessory foods.

A further object of the invention is to provide a new form of ready-to-eat cereal food product, and particularly a rice food product, which may be eaten out of hand, as in the case of potato chips, although it may be eaten, as in the ordinary manner of breakfast foods, either with or without the addition of sugar, cream, and the like.

A further object of the invention is to provide a ready-to-eat cereal food product in fragmentary form consisting of a plurality of mutually adherent cereal grain units, such as rice kernels and/or parts or particles thereof, in which the individual grain units are expanded or puffed, and rendered very crisp and friable.

According to the process, cereal grain units, as whole kernels and/or broken kernels of cereal grain, are cooked in moisture, formed into a strip, ribbon or shred in which the individual units adhere, the strip, etc., is severed or broken into fragments and the fragments or pieces are subjected to heat to cause the adhering individual units in each such fragment or piece to puff up and become very crisp and friable.

More specifically considered, cooked and flavored grain units, and particularly rice, in the form of whole kernels and/or parts or particles thereof, are formed into shreds, strips or ribbons, by passing the cooked grain through forming mechanism, as, for example, suitably grooved rolls, so as to cause the cooked units of grain to adhere to one another in composite masses of ribbon- or strip-like form, after which the ribbon, etc., is severed or broken into pieces or fragments of the desired lengths or dimensions, the pieces or fragments then being dried and finally subjected to heat to cause the individual grain units in each of the pieces or fragments, as well as the fragments as a whole, to puff up or expand to greatly increased size.

The resultant product, specifically considered, consists of crisp and friable pieces or fragments, each composed of a plurality of adhering puffed or expanded cereal grain units.

The food may be prepared without salting, for use as a breakfast cereal, if desired, when it may be eaten with cream or sugar, as in the case of the usual breakfast foods, or it may be eaten out of hand, much as potato chips, for example, are eaten. In the latter case the food may be salted or otherwise flavored to suit the individual taste.

The product resulting from the process provides a unique and very palatable form of cereal food.

The general method of preparing the product is as follows:

The grain, as, for example, rice, which may be whole or broken or consist of both whole and broken kernels, is placed in a cooker together with a suitable quantity of water and flavoring materials, such as sugar and salt. Cooking may be conducted in any suitable utensil, such as a pan, kettle, rotary cooker or other device, although in operating on a large scale the rotary type of cooker is preferred. The cooking is continued until the grain is uniformly cooked.

The grain is then removed from the cooker, partially cooled and partially dried. The partial drying may be accomplished while the grain is being transferred from the cooker to the forming device or such partial drying may be accomplished in part during the transfer and completed before the grain is passed to the forming device. After this partial drying the rice units, which are then rather tough and pliable, are fed through a forming device to form the cooked, partially dried grain into strips, such as ribbons or shreds. Preferably such forming device consists of grooved rolls between which the grain is passed. These grooves, which shape the mass into strips, may be of any desired width, depending upon the final form that it is desired to have the product take. In one case in which the process has been practiced, the grooves were ⅜ inch wide, although, of course, the width of the groove may vary as desired. Where very narrow grooves are used the product at this stage emerges from the rolls in the form of shreds, while where wider grooves are employed the material emerges from the rolls more in the form of wide strips or ribbons and the final product is wafer-like in character.

After the grain emerges from between the rolls in the form of a continuous strip or shred it is preferably cut or broken into pieces or fragments of suitable lengths, say, an inch or so long. These pieces or fragments may be, of course, of considerably greater lengths and subsequently reduced in size after the product is subjected to heat to puff the same.

The strips, whether in the form of shreds or ribbons of varying widths, after emerging from the forming device and being broken up or cut into suitable lengths, are then preferably dried. The degree of moisture in the pieces or fragments after such drying may vary over a considerable range. In any case, it should be below 30 per cent by weight. The dried particles or fragments are then subjected to heat of about 350° to 600° Fahrenheit to puff or expand the individual adhering grain units. This may be accomplished by placing the pieces or fragments in a hot bath of a frying medium, which may be of animal, vegetable or mineral origin, such as oil or fat. The pieces or fragments are permitted to remain in the oil or fat, which is held at a temperature of about 300° to 500° Fahrenheit, until puffed or expanded and cooked to the desired degree of crispness and preferably until a brownish color is obtained. The particles are then removed from the oil or fat and permitted to drain free from excess grease. Salt or other flavoring material may then be added, if desired.

Instead of puffing the fragments or particles by a frying operation, they may be passed through a toasting oven, such as the rotary toasting oven employed in the manufacture of corn flakes and the like, heated to a temperature of, say, 350° to 600° Fahrenheit, wherein the individual kernels as well as the particles as a whole are greatly puffed or expanded and toasted.

A higher moisture content may obtain when the puffing operation is accomplished by frying the fragments or pieces in hot fat or oil. When the puffing operation is performed by dry heat, as in an oven, the moisture content of the grain being treated is desirably reduced to from 5 to 14 per cent and preferably to about 10 or 11 per cent.

Instead of severing the strips into pieces or fragments, then drying the pieces or fragments and then puffing the same, the strip as it emerges from the rolls may be subjected to the drying operation and then still in the form of a strip be subjected to heat to puff the same, and thereafter broken or severed into fragments or pieces of the desired lengths.

In order to more clearly set forth one specific example of the method of manufacture, reference is made to the accompanying drawing, in which—

Figure 1 illustrates schematically and in a general way apparatus which may be employed in carrying out the process;

Fig. 2 is a plan view showing roughly and in a general way one form of the product before the puffing operation;

Fig. 3 is a similar view of the same form of product after the puffing operation;

Fig. 4 illustrates roughly and in a general way a side or edge view of one of the fragments or pieces before the puffing operation; and Fig. 5 is a cross-section illustrating in a general way and on an enlarged scale the final product and showing the puffed up or expanded character thereof.

The following example will serve to set forth one method of preparing one form of the new product, reference being had to the accompanying schematic drawing for purposes of explanation.

Grain, such as rice, which may consist of whole kernels and/or parts or particles thereof, is fed from a hopper 10 to a cooker 11, suitable flavoring, such as salt and sugar in water, being also supplied to the cooker from a container 12. For purposes of illustration, 5 pounds of sugar and 2½ pounds of salt dissolved in 3 gallons of water are supplied for every 100 pounds of rice. The cooker may be of any desired character, although a rotary steam cooker, as indicated in the drawing, is preferred. Assuming the use of such a rotary cooker, after the rice and water with flavoring have been fed to the cooker the latter is closed and steam admitted so as to maintain a steam pressure of, for example, 15 pounds per square inch for a period of one hour or until the rice is properly cooked. As a result of this cooking operation the individual kernels are soft and mushy and considerably swollen.

The rice is then transferred to a drier 13 of any suitable character, where it may be subjected to a blast of air to reduce the moisture content of the cooked grain. Any suitable drier may be employed. At this point the moisture content is reduced until the cooked grain is of a fairly firm, though plastic consistency. The partially dried grain is then transferred to a forming device, which in the present instance is indicated as a pair of co-operating rolls 14 having mutually coacting grooves and tongues or ribs. The annular ribs of one roll fit into the annular grooves of the other roll, the distance between the outer surface of a rib and the bottom of the corresponding groove determining the thickness of the strip, and the width of the co-operating groove and rib determining the width of the strip formed by the rolls. As an example, the strip may be in the form of a ribon ⅜ inch wide and 1/32 inch thick. As the mass of kernels and/or parts thereof pass through the rolls the individual units are flattened somewhat and also caused to adhere to the adjacent units due to some maceration of the edges of the units. The units, however, retain their individuality at least in part. In other words, the ribbon consists, in the specific example, of substantially a single layer of adhering individual units. The individual units of rice, such as whole kernels and/or parts or particles thereof, while flattened and extended in width and length in passing through the rolls, maintain their individuality and due to the pressure are caused to adhere to each other so that the mass issues from the rolls in strip-like form as a single layer of rice units. After the strips emerge from between the rolls they are preferably severed or broken into fragments or pieces 15 of the desired lengths in any suitable manner, as by means of rotary cutters 16, suitable scrapers 17 being employed to strip the severed pieces or fragments from the rolls.

The fragments or pieces, which may be ⅜ inch wide and an inch or so in length, consist, as roughly shown in Fig. 2, of a series of flattened individual rice units consisting of kernels and/or broken kernels or particles, as indicated at 18, although it will be understood that the order of the units will vary in each fragment or piece. The fragments or pieces then pass to a drier, indicated in the present instance as an endless belt 19. Hot air or other suitable medium may be employed for this drying operation. If the fragments or particles are to be puffed in an oven by dry heat the moisture content is reduced to between 5 and 14 per cent, or until the fragments or particles are hard and brittle. Preferably the moisture content is reduced to about 10 or 11 per cent. If the puffing is to be done by hot oil or fat a much higher moisture content may obtain.

The particles or fragments are then subjected to a high heat in order to puff up the individual grain units as well as the fragments or particles as a whole. This puffing may be accomplished by means of a toasting oven or by frying the particles or fragments in hot fat or oil.

If the frying operation is employed, the dried fragments are transferred to a frying device 20, which may be of any suitable character, where the pieces are placed in hot fat, preferably vegetable oil, and allowed to cook at a temperature, say, of 300° to 500° Fahrenheit until crisp, brown and expanded or puffed. A suitable conveyor is preferably employed for conveying the product through the frying device, the movement of such conveyor being so timed as to retain the fragments or pieces in the fryer until the desired results as to puffiness, crispness and color are secured. This frying results in a bodily expansion of the individual rice units and of the fragment or piece as a whole to a greatly increased size. The food is then removed from the fat, allowed to drain, and cooled, when it is ready for packaging or consumption. When the frying operation is employed, the resultant product has a coating of an oleaginous substance. It may be eaten out of hand, a good deal as potato chips are eaten.

The final product, whether fried or subjected to the dry heat of an oven to puff the same, may be generally of rectangular outline, as indicated roughly in Fig. 3. As there indicated, the individuality of the grain units 21 may be retained with the units adhering to adjacent units either directly or through the medium of macerated particles of grain, and the product consists of a layer of grain units, the pieces or fragments being considerably expanded as compared with the same before the puffing operation. Each grain unit of the product is greatly expanded and is cellular, crisp and friable and the structure of the product as a whole is of a like character and has an irregular, bubbly surface. As shown in Fig. 5, the cells of the product vary in size and they lack uniformity in size and distribution. The product as a whole is crisp and friable and readily crumbles into small particles when subjected to pressure between the fingers. It also retains its crispness when mixed with milk or cream and is substantially unaffected by atmospheric conditions.

It is to be understood that there is no particular uniformity in the shape of the fragments or pieces either before or after being subjected to heat to puff the same. This lack of uniformity is due to the fact that the kernels, and/or parts or particles thereof, are arranged in different orders in the different pieces or fragments; and the rolling, drying and puffing operations result in producing pieces or fragments which vary considerably in configuration. Some of the pieces, for example, will be fairly flat while others, or portions thereof, will curl more or less, as indicated in Fig. 4.

It is further to be understood that I do not limit myself to the details specifically set forth herein in describing the invention, the particular procedure described being merely an illustrative example of one embodiment of the invention.

While in the specific example described the strips of adhering cereal grain units are cut or broken into pieces or fragments after issuing from the forming rolls, then dried and then subjected to heat to puff the same, the strip itself may be dried to the desired moisture content, and then puffed, the strip after puffing being subsequently broken or cut into pieces or fragments of the desired size.

I claim:

1. A process of making a ready-to-eat cereal food, comprising cooking in moisture cereal grains, forming the same into a strip, shred, ribbon and the like, in which the individual grains adhere, drying the strip etc., and subjecting pieces or fragments of such strip, etc., to heat to cause the adhering individual grains therein to puff up and become crisp and porous.

2. A process of making a ready-to-eat cereal food, comprising forming a mass of cooked, pliable cereal grain units into strip-like form in which the individual units adhere, drying the strip, and subjecting pieces or fragments of the dried strip to heat to cause the individual adhering units therein to expand bodily and become crisp and porous.

3. A process of making a ready-to-eat cereal food product, comprising cooking in moisture cereal grain units, as, kernels and/or broken kernels, partially drying the cooked units, forming the units into a strip in which the units adhere and in which the substantial individuality of the units is retained, and subjecting pieces or fragments of the strip to heat cause the individual units of the strip to puff up to increased size.

4. A process of making a ready-to-eat cereal food product, comprising cooking rice units, as, kernels and/or broken kernels, in moisture, partially drying the rice units, forming the units into a strip, ribbon and the like in which the cooked units adhere and preserve generally their individuality, drying the strip, etc., until hard and brittle, and subjecting pieces or fragments of such strip to heat to cause the individual adhering rice units therein to puff up.

5. A process of making a ready-to-eat rice food, comprising forming a mass of cooked pliable rice units, as, whose kernels and/or broken kernels, into strip-like form in which the individual units adhere, severing the strips into fragments, drying the fragments until hard and brittle, and subjecting the dried fragments to heat to cause the individual adhering units to expand bodily and become crisp and porous.

6. A process of making a ready-to-eat cereal food comprising cooking in moisture cereal grain units, as, kernels and/or broken kernels, partially drying the cooked units, forming the units into a strip in which the substantial individuality of the units is retained, and frying the same.

7. A process of making a ready-to-eat cereal food comprising cooking in moisture rice units, such as whole kernels and/or parts thereof, partially drying the units, forming the same into ribbons in which the cooked units adhere and subtantially preserve their individuality, severing the ribbons into pieces, further drying the pieces until hard and brittle, and causing the adhering units to puff up and become crisp, friable and porous by frying the pieces.

8. A process of making a ready-to-eat cereal food comprising cooking in moisture rice, such as whole kernels and/or parts thereof, partially drying the rice, forming the same into ribbons in which the cooked rice units adhere and preserve generally their individuality, severing the ribbons into pieces, further drying the pieces until the moisture content is below 30 per cent, and frying the pieces to puff up and render crisp and porous the adhering individual units.

9. A process of making a ready-to-eat rice food comprising cooking rice units, such as whole kernels and/or parts thereof, with seasoning in moisture until thoroughly cooked, drying the mass until the rice units are of a firm consistency, forming the mass into a ribbon consisting of substantially a single layer of units and in which the individual rice units adhere, severing the ribbon into pieces, drying the pieces until hard and brittle, and frying the pieces until the adhering individual units as well as the pieces as a whole become bodily expanded, cellular and crisp.

10. A rice food consisting of a mass of adhering cooked rice units consisting of whole kernels and/or parts thereof, which units have a crisp, puffy, cellular structure and an irregular, bubbly surface, and in which the individuality of the units is substantially preserved.

11. A ready-to-eat cereal food consisting of numerous cooked crisp cellular individual, puffed kernels of grain adhering together and having a coating of an oleaginous substance.

12. A ready-to-eat cereal food consisting of a multiplicity of cooked rice kernels and parts thereof adhering together substantially in a single layer of irregular formation in which the individuality of each kernel is substantially retained, and each such kernel or part being crisp and greatly expanded.

13. A ready-to-eat cereal food consisting of a layer of adhering cooked rice units consisting principally of whole kernels, each kernel of said layer being individually cellular and the whole layer being highly friable.

EUGENE H. McKAY.